(12) United States Patent
Meyer et al.

(10) Patent No.: US 8,720,041 B2
(45) Date of Patent: May 13, 2014

(54) ASSEMBLY METHOD FOR INDUCTION ROTORS

(75) Inventors: Andrew Meyer, Fortville, IN (US); Phil Tooley, Pendleton, IN (US); Kevin Young, Fairmount, IN (US)

(73) Assignee: Remy Technologies, LLC, Pendleton, IN (US)

( * ) Notice: Subject to any disclaimer, the term of this patent is extended or adjusted under 35 U.S.C. 154(b) by 0 days.

(21) Appl. No.: 13/461,506

(22) Filed: May 1, 2012

(65) Prior Publication Data
US 2013/0291372 A1     Nov. 7, 2013

(51) Int. Cl.
*H02K 15/02*     (2006.01)

(52) U.S. Cl.
USPC ............................... 29/596; 29/598; 310/211

(58) Field of Classification Search
USPC ............ 29/596–598, 732–736; 310/211–218, 310/53, 49
See application file for complete search history.

(56) References Cited

U.S. PATENT DOCUMENTS

| | | | | |
|---|---|---|---|---|
| 1,762,017 A | * | 6/1930 | Grenzer | ........................... 29/598 |
| 3,371,410 A | * | 3/1968 | Gintovt | ........................... 29/598 |
| 3,826,940 A | * | 7/1974 | McKean et al. | ............... 310/211 |
| 5,729,885 A | * | 3/1998 | Carosa et al. | ................... 29/598 |
| 5,736,707 A | * | 4/1998 | Nied et al. | ................. 219/117.1 |
| 6,088,906 A | | 7/2000 | Hsu et al. | |
| 6,345,433 B1 | | 2/2002 | Kliman et al. | |
| 6,877,210 B2 | | 4/2005 | Hsu | |
| 6,998,752 B2 | | 2/2006 | Yasuhara et al. | |
| 7,451,538 B2 | * | 11/2008 | Pizzichil | ........................ 29/597 |
| 7,898,138 B2 | | 3/2011 | Kaihatsu et al. | |
| 8,237,322 B2 | * | 8/2012 | Hiramatsu et al. | ............ 310/211 |
| 2002/0153802 A1 | | 10/2002 | Kliman et al. | |
| 2005/0040726 A1 | | 2/2005 | Sato | |
| 2009/0139781 A1 | | 6/2009 | Straubel | |
| 2011/0062819 A1 | | 3/2011 | Lyons et al. | |
| 2011/0175484 A1 | | 7/2011 | Wang et al. | |
| 2012/0034833 A1 | | 2/2012 | Schaube et al. | |

* cited by examiner

*Primary Examiner* — Minh Trinh
(74) *Attorney, Agent, or Firm* — Bose McKinney & Evans LLP

(57) ABSTRACT

A method of assembling an induction rotor includes inserting a plurality of conductor bars into a stack of disks whereby distal ends of the conductor bars project from respective axial ends of the stack, placing first and second end rings onto the respective axial ends of the stack so that the ends of the conductor bars fit into slots in the respective end rings, and compressing the slots against the conductor bars by impacting at least one of the end rings. The method may include selectively adjusting an amount of end ring material being compressed by varying heights of respective areas of a top surface of the end ring and/or selectively adjusting an amount of end ring material being compressed by varying heights of respective areas of an impacting surface.

20 Claims, 9 Drawing Sheets

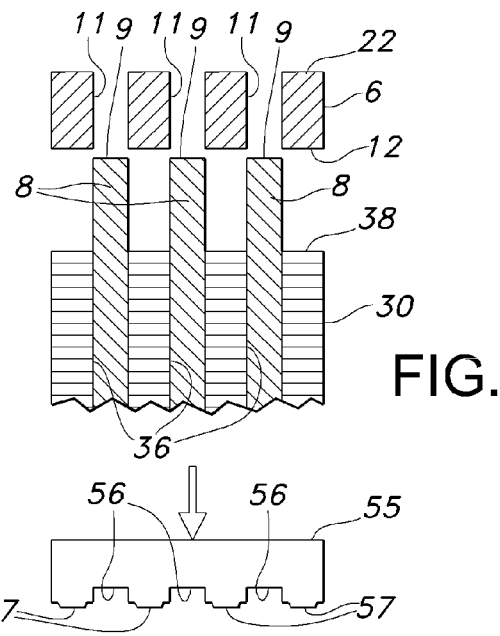
FIG. 7A
FIG. 7B
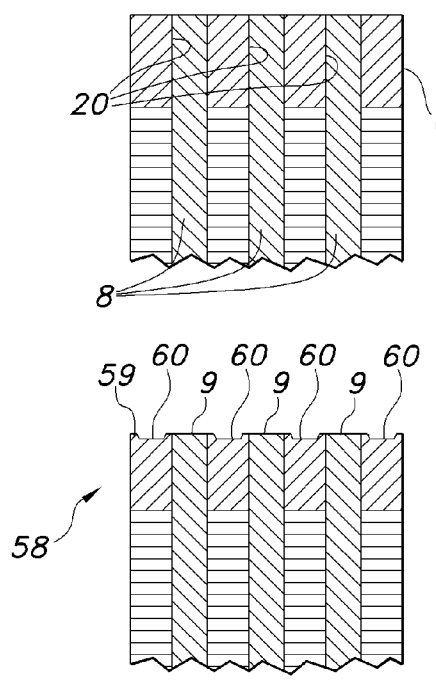
FIG. 7C
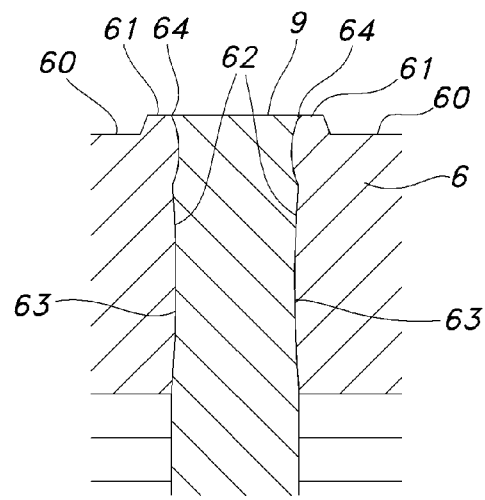
FIG. 7D

ASSEMBLY METHOD FOR INDUCTION ROTORS

BACKGROUND

The present invention relates generally to structural improvement of induction type electric machines and, more particularly, to a method of assembling an induction rotor.

An induction motor is an asynchronous electric machine powered by alternating current (AC), where such power is induced in a rotor via electromagnetic induction. For example, polyphase AC currents may be provided to stator windings structured to create a rotating magnetic field that induces current in conductors of a rotor, whereby interaction between such induced currents and the magnetic fields causes the rotor to rotate. Induction motors may have any number of phases. An induction motor may operate as a generator or traction motor, for example, when driven at a negative slip.

Rotors of induction motors may conventionally include a cage such as a squirrel cage having parallel axial or skewed conductor bars of copper or aluminum extending between opposite rotor ends and positioned at radially outward locations along the circumference of the rotor. The rotor may have a substantially cylindrical iron core formed as a stack of individual laminated disks, for example disks of a silicon steel material. Each core disk may have axial slots for passing the copper or aluminum bars there-through when the slots are in alignment with one another in a lamination stack. Distal ends of individual conductor bars may be structurally supported and in electrical communication with one another by connection of the respective bar ends to one or more end rings disposed at each rotor end.

Due to the high costs associated with permanent magnet electric motors, electric machines for many different applications are being redesigned to utilize induction rotors. However, conventional induction rotors may have a reduced number of applications due to poor mechanical properties of the chosen material and/or due to inconsistent assembly methods, especially when structural weakness is exacerbated by the size and speed of the rotor. When an induction motor is utilized in a given application such as automotive, the rotor must tolerate high speed rotation and associated large centrifugal force. In addition, high temperatures, potential metal fatigue, and other factors may aggregate to cause structural breakdown resulting in damage or deformation of the rotor. For example, an induction rotor generates higher temperatures within the rotor itself, further reducing mechanical and structural integrity.

There are various conventional techniques that may be used for assembling induction rotors. For example, conventional induction machines may utilize varying grades of aluminum or copper in die-casting the end rings/plates and the conductor bars of the cage as an integral unit. However, conventional die-cast induction rotors may have a reduced number of applications due to poor mechanical properties of the chosen die-cast material and due to problems related to manufacturing. Depending on the grade, the cast material strength may vary significantly. Another conventional induction rotor assembly technique may include forming individual conductor bars, forming two end rings having slots/channels corresponding to the axial slots of the lamination stack, inserting the bars through the axial slots, positioning the respective end rings at the opposite axial ends of the rotor so that the conductor bars pass through the end rings, pressing the end rings axially toward one another, and then welding the end portions of the conductor bars to the end rings. Such welding of conductor bars may produce inconsistent results and poor contact between the end rings and the conductor bars. A further conventional technique for assembling induction rotors may substitute a heading operation for the welding of conductor bars. In such a heading process, the protruding ends of the conductor bars are compressed and flattened against the respective exterior axial surfaces of the end rings. Structural problems may result from a heading operation. After being impacted in an axially inward direction, the compressed conductor bars become self-biasing in an axially outward direction and, over time, such conductor bars expand and become loose with respect to the end ring slots.

SUMMARY

It is therefore desirable to obviate the above-mentioned disadvantages by providing a method of assembling an induction rotor that provides consistent contact and secure engagement between conductor bars and end rings. The disclosed embodiments yield improved electrical and mechanical characteristics, reducing or eliminating loose fitting engagement by preventing length contraction and expansion of rotor conductor bars.

According to an embodiment, a method of assembling an induction rotor includes providing a plurality of conductor bars in a rotor core so that distal ends of the conductor bars project from respective axial ends of the core, placing first and second end rings onto the respective axial ends of the core so that the ends of the conductor bars fit into slots in the respective end rings, and impacting at least one of the end rings, thereby locking the end ring to the conductor bars.

According to another embodiment, a method of assembling an induction rotor includes providing a plurality of conductor bars in a rotor core so that distal ends of the conductor bars project from respective axial ends of the core, placing first and second end rings onto the respective axial ends of the core so that the ends of the conductor bars fit into slots in the respective end rings, and reducing the volume of the slots, thereby locking the end ring to the conductor bars.

According to a further embodiment, apparatus for assembling an induction rotor includes a housing for retaining a rotor core and two end rings in axial alignment, the rotor core and end rings each having a plurality of longitudinally extending slots containing conductor bars. Such apparatus also includes a press for providing an impacting force, and an impacting surface for transferring the impacting force to one of the end rings to thereby compress the respective end ring slots against the conductor bars.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein:

FIGS. 7A-7D show simplified cross sectional views of a portion of an induction rotor, illustrating a rotor assembly method according to an exemplary embodiment;

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1:
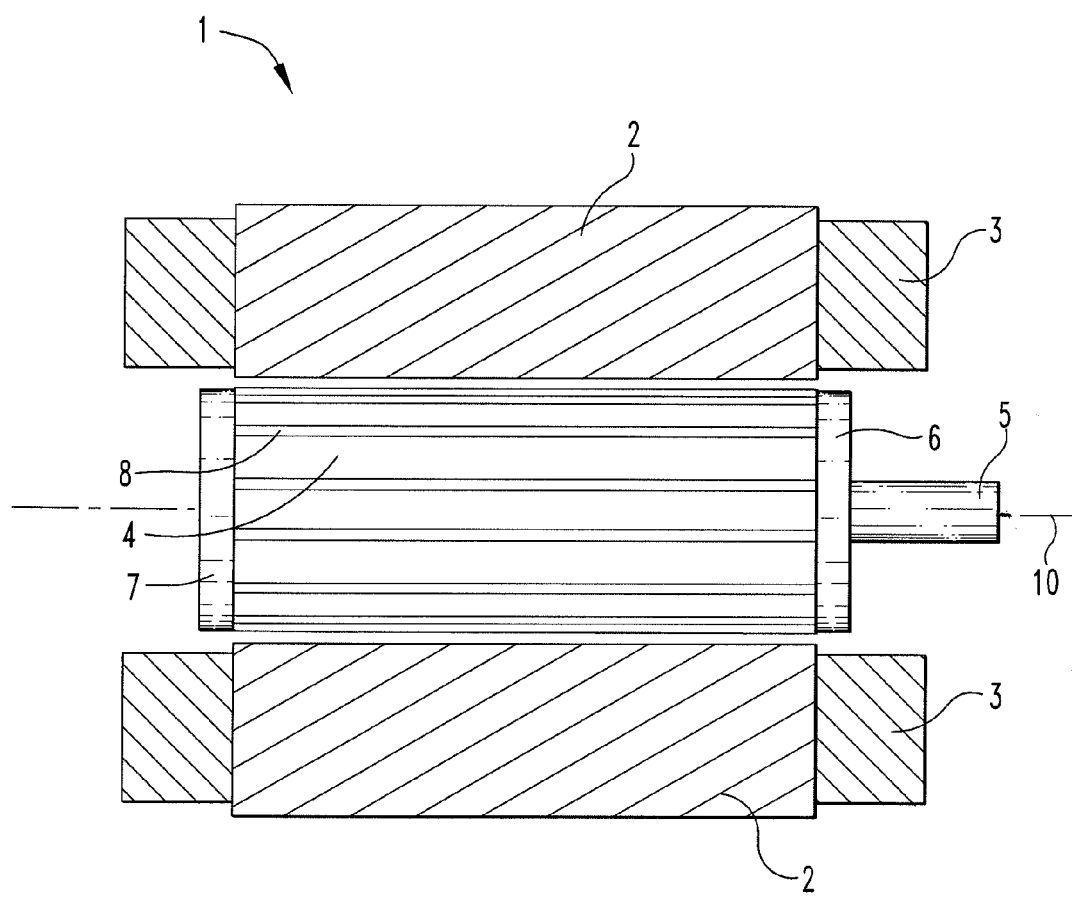
FIG. 1 is a schematic view of an induction type electric machine.

FIG. 1 is a schematic view of an induction type electric machine 1 such an induction motor/generator. In an exemplary embodiment, electric machine 1 may be a traction motor for a hybrid or electric type vehicle. Electric machine 1 has a stator 2 that includes a plurality of stator windings 3 typically disposed in an interior portion thereof. Stator 2 may be securely mounted in a housing (not shown) having a plurality of longitudinally extending fins formed to be spaced from one another on an external surface thereof for dissipating heat produced in the stator windings 3. For example, stator 2 may have a non-magnetic, electrically non-conductive bobbin (not shown) wound with separate phase coils. A rotor 4 has a center shaft 5 and is concentrically mounted within stator 2 so that rotor 4 rotates circumferentially respecting a longitudinal axis of shaft 5. Rotor 4 has a front end ring portion 6 and a rear end ring portion 7 respectively disposed at opposite axial ends of rotor 4, each being formed by a process that includes die-casting. When a voltage from an external power source (not shown) is supplied to the stator windings, stator 2 produces a rotating magnetic field. In operation, voltage is impressed on rotor 4 as an induced voltage. The inductive interaction of the rotating magnetic field with longitudinally extending conductive bars 8 of rotor 4 causes rotor 4 to rotate.

Figure 2:
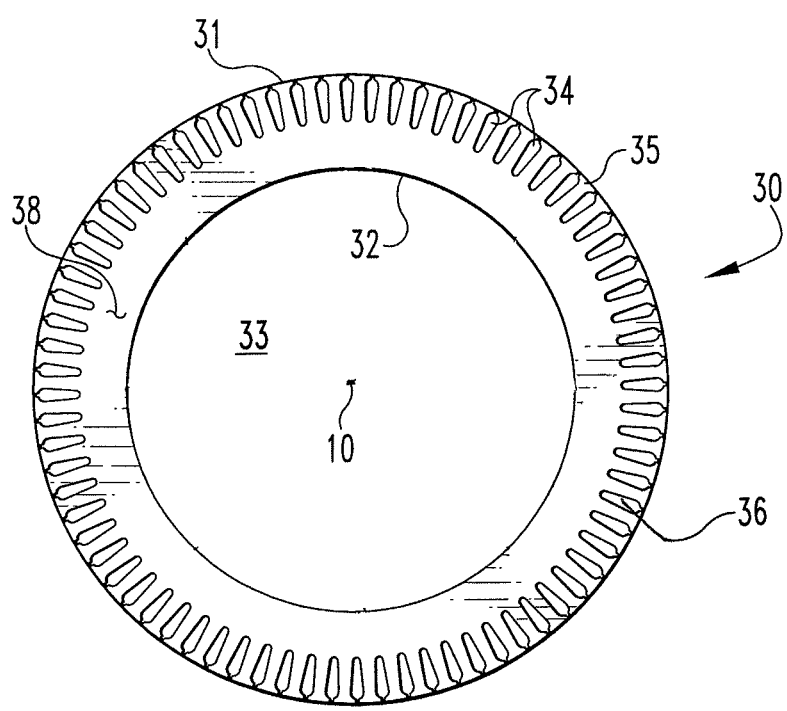
FIG. 2 is a top plan view of an induction motor rotor lamination stack.

FIG. 2 is a top plan view of an induction motor rotor lamination stack 30 formed by stacking individual laminations, each typically made of steel sheet metal and generally shaped as a ring or disk. The laminations may be formed, for example, by a stamping operation. When assembled, lamination stack 30 has a generally columnar shape around central longitudinal axis 10. The laminations are each formed so that assembled lamination stack 30 has a uniform center aperture 33 within which shaft 5 and associated structure may be positioned. Annular inner surface 32 may include a slot (not shown) for engaging a hub, shaft, or other structure of rotor 4. Spaces/holes 34 are typically formed around the periphery of each lamination so that when the laminations are placed in registration with one another by forming lamination stack 30, such spaces form corresponding continuous passages or slots 36 each extending in a generally lengthwise direction through lamination stack 30 proximate the radially outward exterior surface 31. Such slots 36 may be substantially parallel with central longitudinal axis 10 of rotor 4 or they may be skewed. An assembly of laminations may be formed/stacked as a spiral.

In order to reduce vibration, magnetic noise, and unwanted linear and radial movement of the laminations, and/or to reduce adverse effects of variations in dimensions (e.g., thicknesses) of individual laminations, lamination stack 30 may be formed with incremental variations in the shapes of individual laminations. In addition, for example, the laminations may be arranged in groups prior to stack assembly and such groups may include slight variations in shapes of individual teeth 35, whereby a particular resonance is avoided. Lamination stack 30 may be formed with structure physically attached to individual laminations or to stack 30 in order to modify the corresponding electromagnetic profile. An assembly of lamination stack 30 may include bolting, riveting, welding, brazing, bonding, clamping, or staking, whereby mass distribution, elastic distribution, damping, and electromagnetic profile are affected. The electromagnetic structure may also be affected, for example, by selection of the particular interference fit used for staking adjacent laminations, and by the amount of force used by a staking punch for radially compressing a boss (not shown) of a lamination within a hole of an adjacent lamination.

Figure 3A:
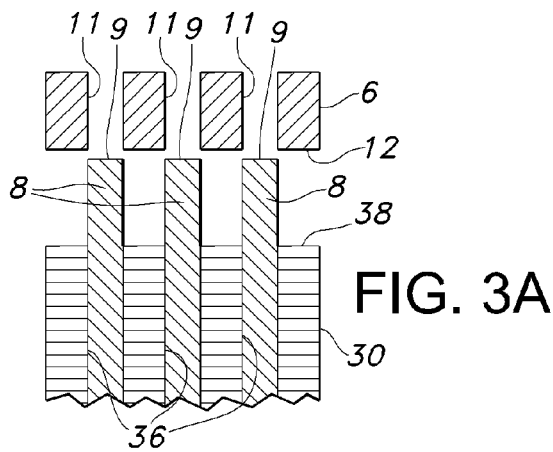
FIGS. 3A-3D show simplified cross sectional views of a portion of an induction rotor, illustrating an exemplary rotor assembly method.

FIGS. 3A-3D each show a simplified cross sectional view of a portion of an induction rotor, and are provided for illustrating an exemplary assembly method. As shown in FIG. 3A, a lamination stack 30 is assembled and placed into a retaining fixture (not shown). Conductor bars 8 are inserted into lamination channels 36 and through lamination stack 30, whereby conductor bar ends 9 extend axially outward of the top surface 38 of lamination stack 30. Similarly, the opposite ends (not shown) of conductor bars 8 extend below a bottom surface (not shown) of lamination stack 30. An end ring 6 has a plurality of clearance holes/slots 11 formed around a circumference thereof and aligned with corresponding channels 36 and conductor bars 8. End ring 6 is placed so that conductor bars 8 pass through slots 11, and is seated when axially inward facing surface 12 of end ring abuts top surface 38 of lamination stack 30. When conductor bars 8 are inserted into end ring 6, there are gaps/voids 19 in slots 11 that provide clearance between a given conductor bar 8 and slot 11. Portions of conductor bars 8 may be tapered or shaped in any appropriate manner.

Figure 3B:
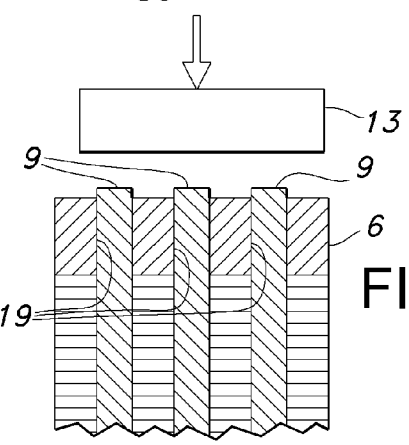
Figure 3C:
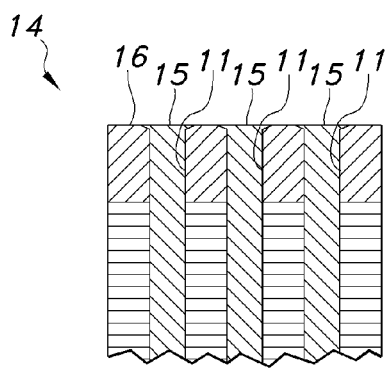
Figure 3D:
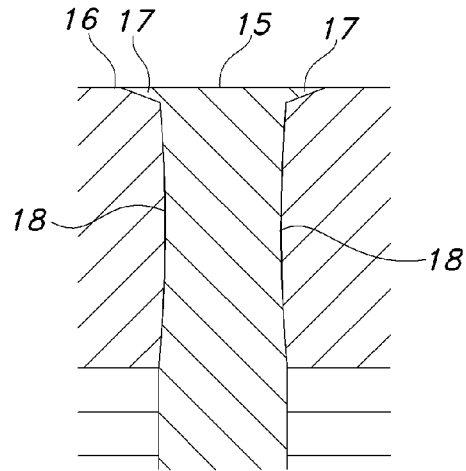

When end ring 6 has been seated and is flush with lamination stack 30, a punch 13 impacts conductor bar ends 9 as shown in FIG. 3B. Conductor bars 8 are formed of a ductile material such as copper that deforms and does not significantly fracture when the force of the impacting from punch 13 is applied. The applied force exceeds the yield strength of conductor bars 8, whereby the copper or other material is compressed into end ring holes 11 to significantly improve contacting between end ring 6 and individual conductor bars 8. The amount of force and velocity thereof are adjusted to optimize the filling of end ring holes 11 with the compressed copper of conductor bars 8. FIGS. 3C and 3D each show a cross section of a portion of the resultant headed assembly 14 after the impacting. Compressed/flattened conductor bar heads 15 become approximately flush with axially outward facing end ring surface 16, and a flange 17 or similar portion may be formed for a given conductor bar 8, depending on various factors such as the amount of conductor bar 8 being compressed into end ring hole 11, the force (e.g., velocity) of punch 13, the amount of clearance between conductor bar 8 and end ring hole 11 prior to the impacting, the ambient and/or applied heat, the ductile properties of conductor bar 8 and end ring 6, and others. The deformed end ring material optimally completely fills the corresponding clearances between end ring 6 and circumferential portion(s) 18 of conductor bars 8 that existed prior to the impacting, so that portions 18 are in tight abutment with compressed surfaces of end ring holes 11, whereby electrical resistance is reduced and rotor efficiency is increased.

The induction rotor assembly method illustrated in FIGS. 3A-3D is problematic because the impacting causes a compression of conductor bars 8 in the lengthwise or axial direction. When conductor bars 8 subsequently expand in the opposite lengthwise or axial direction, they may become loose, which results in reliability problems for rotor 4. This lengthwise expansion of rotor bars 8 may also be different for various rotor bars 8, whereby the respective tension, tightness, and integrity of mechanical engagement, and the associated performance of individual conductor bar portions may be inconsistent. Such problems are exacerbated by vibration, heat, and other operational conditions experienced by electrical machine 1, resulting in a reduction of machine life. In addition, when heat is applied during the conventional rotor assembly process, ancillary rotor parts may be affected and additional manufacturing operations may be necessitated, such as those involving ovens, venting, safety and personnel protections, environmental protections, costs, cooling times and cooling areas, fixturing, and others.

Figure 4A:
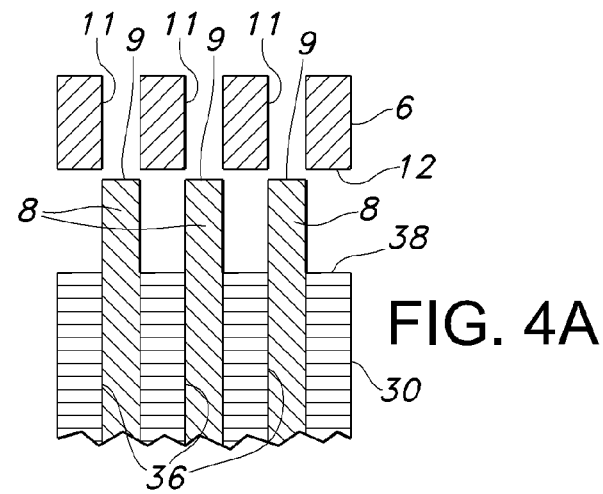
FIGS. 4A-4D show simplified cross sectional views of a portion of an induction rotor, illustrating a rotor assembly method according to an exemplary embodiment.

FIGS. 4A-4D each show a simplified cross sectional view of a portion of an induction rotor, and are provided for illustrating an assembly method according to an exemplary embodiment. As shown in FIG. 4A, a lamination stack 30 is assembled and placed into a retaining fixture (not shown). Conductor bars 8 are inserted into lamination channels 36 and through lamination stack 30, whereby conductor bar ends 9 extend axially outward of the top surface 38 of lamination stack 30. Similarly, the opposite ends (not shown) of conductor bars 8 extend below a bottom surface (not shown) of lamination stack 30. An end ring 6 has a plurality of clearance holes/slots 11 formed around a circumference thereof and aligned with corresponding channels 36 and conductor bars 8.

Figure 4B:
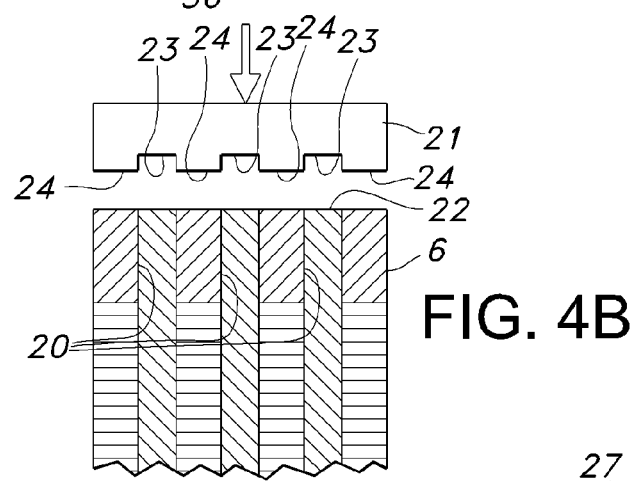

FIG. 4B shows end ring 6 placed so that conductor bars 8 pass through slots 11, whereby end ring 6 is seated when axially inward facing surface 12 of end ring 6 abuts top surface 38 of lamination stack 30. When conductor bars 8 are inserted into end ring 6, there are gaps/voids 20 in slots 11 that provide clearance between a given conductor bar 8 and slot 11. When end ring 6 has been seated and is flush with lamination stack 30, a punch 21 impacts the top surface 22 of end ring 6. Punch 21 has cavities/indented portions 23 that are aligned with conductor bars 8 so that when punch 21 impacts end ring 6, conductor bars 8 are not directly impacted. Instead, contacting surface(s) 24 of punch 21 strikes end ring 6 and compresses end ring material into voids 20. End rings 6, 7 and conductor bars 8 are formed of a ductile material such as copper that deforms and does not significantly fracture when the force of the impacting from punch 21 is applied. The applied force exceeds the yield strength of end ring 6, whereby the copper or other material is compressed into end ring voids 20 to significantly improve contacting between end ring 6 and individual conductor bars 8. The amount of force and velocity thereof are adjusted to optimize the filling of end ring voids 20 with the compressed copper of end ring 6.

Figure 4C:
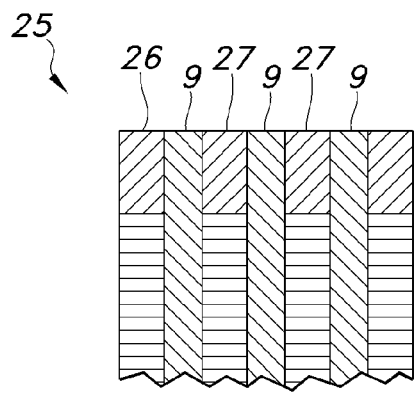
Figure 4D:
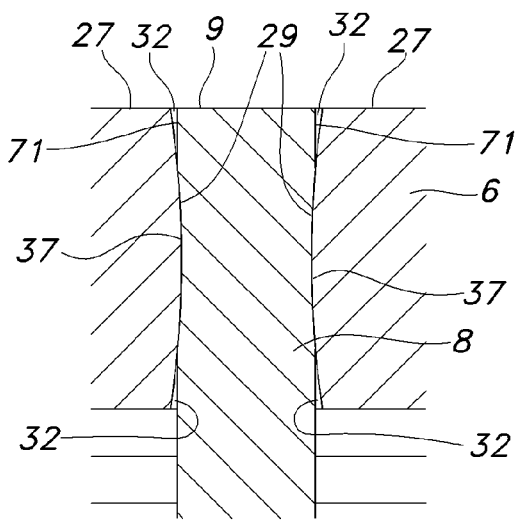
Figure 5:
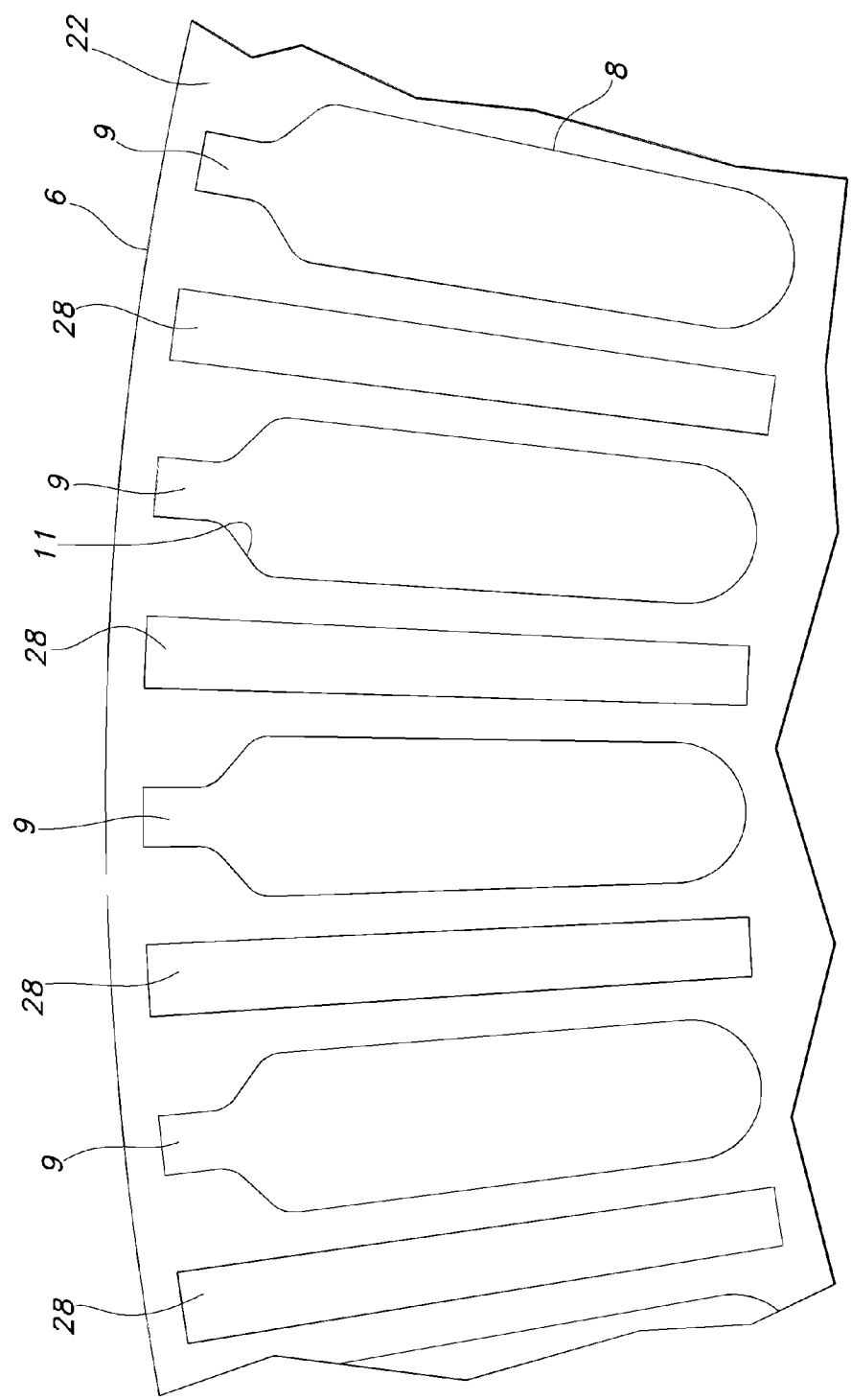
FIG. 5 is a partial top plan view of an induction rotor showing relative positions of conductor bars and rectangular impact target areas interposed therebetween, according to an exemplary embodiment.

FIGS. 4C and 4D each show a simplified cross section of a portion of the resultant assembly 25 after the impacting. The compressed top surface 26 includes compressed portions 27 between adjacent conductor bars 8. For example, FIG. 5 is a top plan view of a portion of assembly 25 showing impact areas 28 that are targeted by contacting surfaces 24 of punch 21. Such contacting surfaces 24 may be structured as rectangles for striking end ring top surface 22 between adjacent ones of end ring slots 11. When top surface 22 of end ring 6 is substantially flat prior to the impacting, impact areas 28 may become concave surfaces having the same shape as the corresponding rectangular contacting surfaces 24. When top surface 22 has protrusions in impact areas 28 prior to the impacting, then the impacting from punch 21 may result in compressed end ring surface 26 becoming substantially flat. The surface area and shape of the contacting surface(s) 24 of punch 21 may optionally be the same as that of top surface 22 of end ring 6. For example, contacting surface 24 may be a round disk having indented cavities 23 aligned with and shaped the same as corresponding ones of end ring slots 11, and a plan view of such an impacting surface may be substantially similar to that shown in FIG. 2. In such a case, compressed top surface 26 may become uniform and substantially flat. The impacting of end ring 6 compresses the relatively soft metal (e.g., copper) so that the metal is pressed around conductor bars 8 without substantially impacting conductor bar ends 9. Metal of end ring 6 is pressed against conductor bar 8 to greatly reduce resistivity along main body portion 37 of conductor bar 8. Very slight gaps/voids 32 may remain at given portions of the end ring/conductor bar interface, depending on the choice of contacting surfaces 24, pre-impact end ring surface shape(s), and parameters such as ambient and/or applied heat, impact force, deformation volume, initial gap volume, conductor bar/end ring slot shapes, punch force (e.g., velocity), ductile properties, and other related factors. As shown in FIG. 4D, the compressing forces end ring material 29 against main body portion 37, whereby main body portion 37 may then have a smaller cross sectional profile area compared with that of conductor bar end 9. The axial length of conductor bar 8 may be chosen so that conductor bar end 9 is below end ring surface 22 prior to the compressing, and then becomes flush with compressed top surface 26. As a result of the compressing, main body portion 37 is in tight abutment with the surface of end ring holes 11, whereby electrical resistance is reduced and rotor efficiency is increased.

The contiguous relation of enlarged end ring material 29 in the middle of end ring slot 11 and corresponding non-narrowed portions 71 of conductor bar 8 acts to lock conductor bar 8 in place because the axially outward bias of end ring 6 presses the corresponding surfaces together. Thereby, the problem of compressed conductor bars having "memory" and being biased for returning to pre-compression length is obviated by minimizing compression of conductor bars 8 and by compressing end ring material 29 against main body portion 37. The disclosed compression of lamination stack 30 and end rings 6, 7 causes end ring 6 to be biased axially outward and into further engagement with respective conductor bars 8.

Figure 6A:
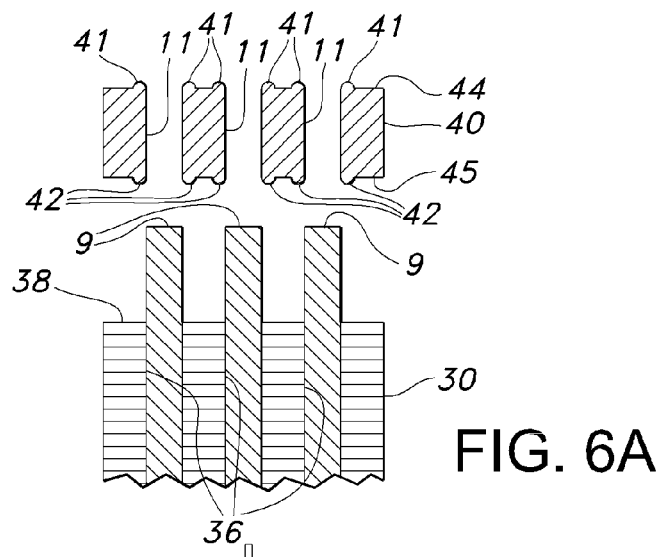
FIGS. 6A-6D show simplified cross sectional views of a portion of an induction rotor, illustrating a rotor assembly method according to an exemplary embodiment.

FIGS. 6A-6D each show a simplified cross sectional view of a portion of an induction rotor, and are provided for illustrating an assembly method according to an exemplary embodiment. Lamination stack 30 is assembled and placed into a retaining fixture (not shown). Conductor bars 8 are inserted into lamination channels 36 and through lamination stack 30, whereby conductor bar ends 9 extend axially outward of the top surface 38 of lamination stack 30. Similarly, the opposite ends (not shown) of conductor bars 8 extend below a bottom surface (not shown) of lamination stack 30. An end ring 40 has a plurality of clearance holes/slots 11 formed around a circumference thereof and aligned with corresponding channels 36 and conductor bars 8. As shown in FIG. 6A, end ring 40 has top projections 41 and bottom projections 42 respectively extending from end ring top surface 44 and end ring bottom surface 12 and formed about each end ring slot 11.

Figure 6B:
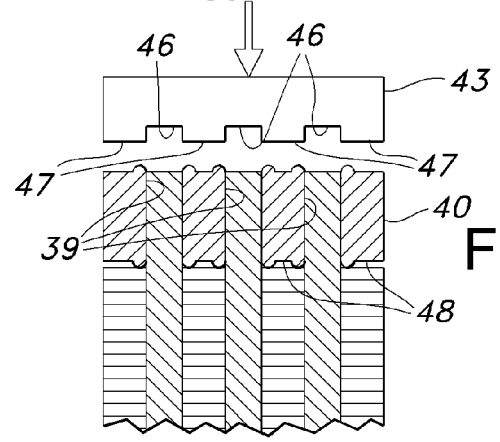

FIG. 6B shows end ring 40 placed so that conductor bars 8 pass through slots 11, whereby end ring 40 is pre-seated when bottom projections 42 of end ring 40 abuts top surface 38 of lamination stack 30. When conductor bars 8 are inserted into end ring 40, there are gaps/voids 39 in slots 11 that provide clearance between a given conductor bar 8 and slot 11. There are also spaces 48 created by bottom end ring projections 42 offsetting end ring surface 45 away from lamination stack top surface 38. When end ring 40 has been pre-seated, a punch 43 impacts top surface 44 of end ring 40. Punch 43 has cavities/indented portions 46 that are aligned with conductor bars 8 so that when punch 43 impacts end ring 40, conductor bars 8 are not directly impacted. Instead, contacting surface(s) 47 of punch 43 strikes end ring 40 and compresses end ring material, including material of projections 41, 42 into voids 39. Bottom end ring projections 42 become compressed, thereby making end ring surface 45 flush with lamination stack top surface 38. End ring 40 and conductor bars 8 are formed of a ductile material such as copper that deforms and does not significantly fracture when the force of the impacting from punch 43 is applied. The applied force exceeds the yield strength of end ring 40, whereby the copper or other material is compressed into voids 39 to significantly improve contacting between end ring 40 and individual conductor bars 8. The amount of force and velocity are adjusted to optimize the filling of end ring voids 39 with the compressed copper of end ring 40.

Figure 6C:
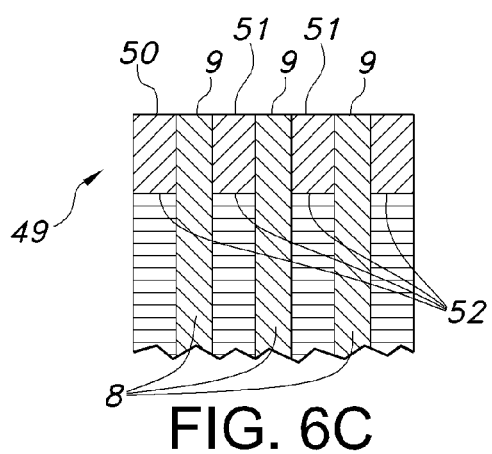
Figure 6D:
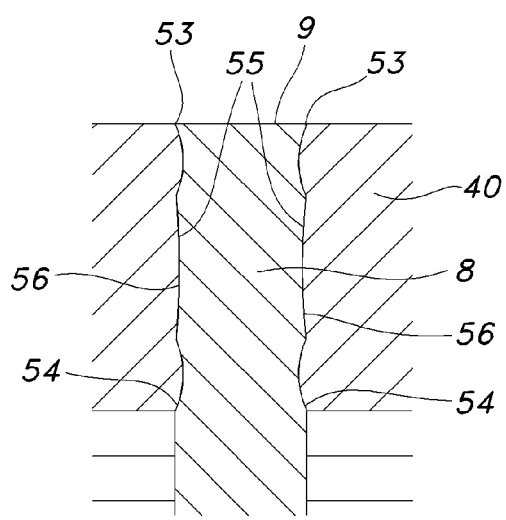
Figure 8A:
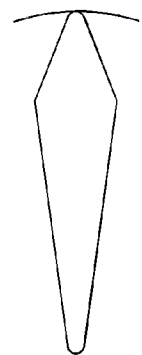
FIGS. 8A-8H are respective top plan views of exemplary conductor bar slot shapes that may be adapted for use with the disclosed embodiments.
Figure 8B:
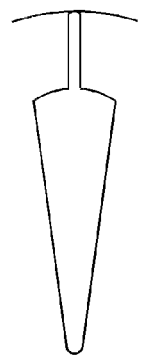
Figure 8C:
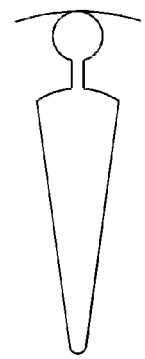
Figure 8D:
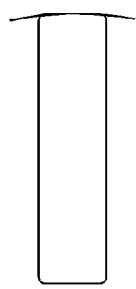
Figure 8E:
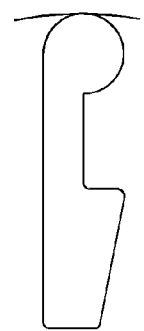
Figure 8F:
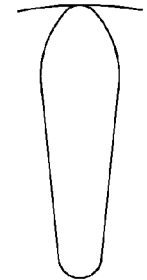
Figure 8G:
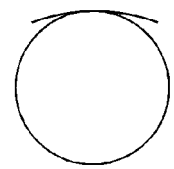
Figure 8H:
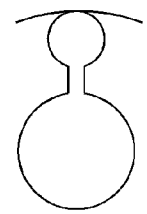

FIGS. 6C and 6D each show a simplified cross section of a portion of the resultant assembly 49 after the impacting. The compressed top surface 50 includes compressed portions 51 between adjacent conductor bars 8. The compressed top surface 50 and compressed bottom surface 52 are now flattened and the material of projections 41, 42 is now contiguous with conductor bar 8 at top end ring/conductor bar interface 53 and bottom end ring/conductor bar interface 54. In addition, the compressed main body portion 55 about a given end ring slot 11 and the compressed main body 56 of conductor bar 8 each has a more consistent cross section shape when viewed axially along the conductor bar portion from lamination stack 30 to conductor bar end 9.

FIGS. 7A-7D each show a simplified cross sectional view of a portion of an induction rotor, and are provided for illustrating an assembly method according to an exemplary embodiment. Lamination stack 30 is assembled and placed into a retaining fixture (not shown). Conductor bars 8 are inserted into lamination channels 36 and through lamination stack 30, whereby conductor bar ends 9 extend axially outward of the top surface 38 of lamination stack 30. Similarly, the opposite ends (not shown) of conductor bars 8 extend below a bottom surface (not shown) of lamination stack 30. An end ring 6 has a plurality of clearance holes/slots 11 formed around a circumference thereof and aligned with corresponding channels 36 and conductor bars 8.

FIG. 7B shows end ring 6 placed so that conductor bars 8 pass through slots 11, whereby end ring 6 is seated when axially inward facing surface 12 of end ring 6 abuts top surface 38 of lamination stack 30. When conductor bars 8 are inserted into end ring 6, there are gaps/voids 20 in slots 11 that provide clearance between a given conductor bar 8 and slot 11. When end ring 6 has been seated and is flush with lamination stack 30, a punch 55 impacts the top surface 22 of end ring 6. Punch 55 has cavities/indented portions 56 that are aligned with conductor bars 8 so that when punch 55 impacts end ring 6, conductor bars 8 are not directly impacted. Instead, contacting surface(s) 57 of punch 55 strikes end ring 6 and compresses end ring material into voids 20. Contacting surface(s) 57 has protrusions that have a contoured shape. In FIG. 7B, the contoured shape has a raised portion, although contacting surface(s) 57 may be formed in any appropriate shape. For example, contacting surface(s) 57 may have a raised portion that approximates the shape of a target impact area 28 (e.g., FIG. 5), may include portions of various sizes and heights, may include spiked portions, may include portions structured to impact protrusions formed in end ring 6, may include alternating raised and lowered portions, may include a series of protrusions, may include protrusions that outline at least a portion of a slot 11, may be structured for compressing an end ring slot 11 having any shape, and others. A given end ring slot 11 may have a shape such as those shown by way of non-limiting example in FIGS. 8A-8H, and corresponding contacting surface(s) 57 may, for example, have portions structured for impacting at least a portion of end ring material surrounding such slot.

FIGS. 7C and 7D each show a simplified cross section of a portion of the resultant assembly 58 after the impacting. The compressed top surface 59 includes compressed and indented portions 60 between adjacent conductor bars 8. For example, indented portion 60 may have a shape of impact area 28 shown in FIG. 5. When top surface 22 of end ring 6 is substantially flat prior to the impacting, indented portions 60 may become concave surfaces having the same shape as the corresponding contacting surface(s) 57. Indented portions 60 may partially or completely surround respective ones of slots 11. Compressed material of end ring 6 fills spaces 20 so that such material of end ring 6 is contiguous with respective conductor bars 8. The compressed main body portion 62 about a given end ring slot 11 and the compressed main body 63 of conductor bar 8 are pressed together to form a contiguous interface along the conductor bar portion from lamination stack 30 to conductor bar end 9. The compressing forces the end ring material laterally toward conductor bar 8 at upper portions 61, whereby the end ring/conductor bar interface 64 has reduced resistivity. As with other embodiments, the amount of impacting force and velocity are adjusted to optimize the filling of spaces 20 with the compressed copper of end ring 6.

Any features of the disclosed embodiments may be practiced in combination with one another, depending on a particular application. The impacting of a given end ring may be performed in a single strike, in multiple strikes, in association with other induction rotor processing, or in a series of strikes as part of concurrent or independent processes. The impacting may be imposed at any angle relative to the top surface of a given end ring. For example, a contacting surface of a punch may include individual spike-shaped portions (not shown) that strike an end ring top surface in a direction toward a slot 11, such striking being at an angle with respect to a longitudinal axis of the induction rotor. In an exemplary embodiment, end rings 6, 7 are pressed toward one another prior to the compressing step, thereby axially biasing lamination stack 30 against end rings 6, 7. As a result, a consistent and substantially uniform axially outward biasing further maintains the integrity of the induction rotor after the compressing operation because a slight axially outward biasing of lamination stack 30 strengthens the interface of conductor bars 8 and compressed slots 11.

Figure 9:
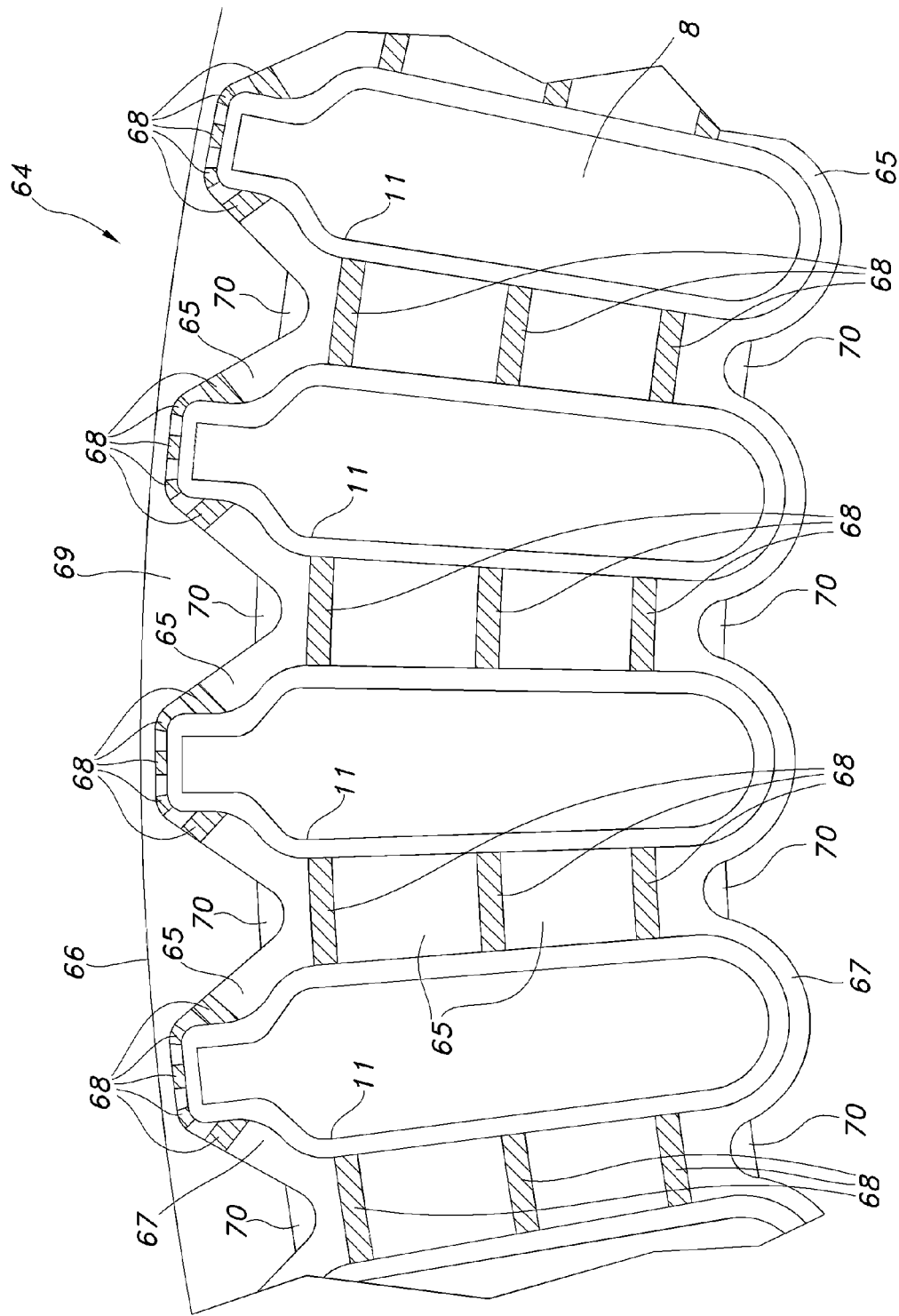
FIG. 9 is a partial top plan view of an induction rotor assembly according to an exemplary embodiment.

FIG. 9 is a partial top plan view of an exemplary embodiment of an induction rotor 64 having an end ring 66 with a top surface 69 that includes impacting target area 67. Target area 67 has protrusions/convex portions 65 that are separated by concave portions 68, whereby the impacting compresses portions 65 into portions 68, in addition to compressing end ring material against conductor bars 8, thereby selectively modulating the filling of gaps/voids between slots 11 and conductor bars 8. For example, since the space is relatively small between the outer radial perimeter of end ring 66 and the outer radial portion of conductor bar 8, a series of concave portions 68 may be spaced apart along this portion of end ring 66, whereby the impacting of target area 67 forces end ring material into concave portions 68 to provide relief and avoid excessive pressure and material at a relatively fragile portion of end ring 66. Other portions of top surface 69 may include convex portions 65 and/or portions that are neither concave nor convex. In this manner, control over compression of material may include selectively adjusting the amount of material being compressed at specific locations. Concave-convex portions may be defined in any axis, whereby relief and compression modulation may be provided for lateral as well as axial material movement. For example, partitions between convex portions 65 and concave portions 68 may be angled, and may include variations in axially extending portions of end ring slots 11 and/or protruding portions of top surface 69. In an exemplary embodiment, an axially extending groove 70 is formed in end ring 66, whereby the impacting of adjacent convex portions 65 forces end ring material in a substantially axial direction. Concave-convex portions may include at least one groove in an interior bore portion of at least one of the respective slots 11 and at least one corresponding projection aligned with the groove, whereby the impacting forces material of the projection into the groove. Concave-convex portions may include alternating concave and convex portions formed about respective slots 11. The terms "concave" and "convex" are used herein to describe voids and protrusions having any shape or profile and are not limited to curved or otherwise regular surfaces. Conductor bars 8 may include tapered portions.

Contoured impact surfaces of a punch impacting surface may each have a protrusion volume distribution in proportion to a corresponding void space between a conductor bar and slot. Similarly, a given end ring may include protrusions surrounding respective ones of slots 11, the protrusions each having a volume distribution in proportion to voids between conductor bar 8 and slot 11. Convex portions may be provided on both top and bottom surfaces of either end ring. End rings 6,7 may be impacted simultaneously for locking conductor bars 8 at both axial ends of rotor 4.

In various embodiments, conductor bar ends 9 may be brazed to end ring 6. For example, a brazing alloy or filler metal may be melted and distributed by capillary action at conductor bar ends 9 to thereby further improve bonding of conductor bars 8 with end ring 6.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. A method of assembling an induction rotor, comprising:
   providing a plurality of conductor bars in a rotor core so that distal ends of the conductor bars project from respective axial ends of the core;
   providing first and second end rings each having a plurality of circumferentially-spaced, longitudinal slots;
   placing the first and second end rings onto the respective axial ends of the core so that the ends of the conductor bars fit into the slots in the respective end rings; and
   impacting at least one of the placed end rings, thereby locking the at least one end ring to the conductor bars.

2. The method of claim 1, further comprising, prior to the impacting, providing a protruding portion on at least one of the end rings adjacent respective ones of the slots, whereby the impacting compresses the protruding portion so that the respective slot is urged against a corresponding one of the conductor bars.

3. The method of claim 2, wherein convex portions are provided on both top and bottom surfaces of the end ring.

4. The method of claim 1, further comprising providing an impact tool having an impact surface substantially parallel to an axially outward-facing surface of the at least one end ring, the impact surface having a plurality of cavities respectively aligned with the slots, wherein the impacting includes striking the end ring with the impact surface without directly impacting the conductor bars.

5. The method of claim 4, wherein the impact surface has a footprint substantially the same as that of the end ring surface.

6. The method of claim 1, wherein the impacting includes a series of individual impacts.

7. The method of claim 1, further comprising providing a plurality of protruding or recessed portions on at least one of the end rings adjacent respective ones of the slots, whereby the impacting compresses the protruding or recessed portions so that material about the slots fills in gaps between the slots and the conductor bars.

8. The method of claim 7, wherein the one end ring has both protruding and recessed portions.

9. The method of claim 7, wherein the protruding or recessed portions include alternating concave and convex portions formed about the respective slots.

10. The method of claim 1, wherein the impacting compresses the slots against the conductor bars.

11. The method of claim 10, further comprising selectively adjusting an amount of end ring material being compressed by varying heights of respective areas of a top surface of the end ring.

12. The method of claim 10, wherein the end ring includes a protrusion surrounding a slot, the protrusion having a volume distribution proportional to volume distribution of void space between the slot and a corresponding conductor bar.

13. The method of claim 10, wherein the compressing includes impacting each end ring outer axial face with a respective impact surface having a shape substantially the same as that of the corresponding axial face.

14. The method of claim 10, further comprising selectively adjusting an amount of end ring material being compressed by varying heights of respective areas of an impacting surface performing the impacting.

15. The method of claim 1, wherein the impacting includes striking respective locations about ones of the slots, the striking being at an angle with respect to a longitudinal axis of the induction rotor.

16. The method of claim 1, wherein impact locations of the impacting are interposed between adjacent ones of the end ring slots.

17. The method of claim 1, further comprising pressing the end rings toward each other prior to the impacting step, thereby axially biasing the stack against the end rings.

18. The method of claim 1, further comprising pressing the end rings toward each other prior to the impacting step, thereby axially biasing the rotor core against the end rings.

19. The method of claim 1, further comprising providing an impacting tool having a plurality of contoured impact surfaces, wherein the impacting includes the impact surfaces striking end ring portions adjacent the respective slots, thereby impressing the respective contours into the corresponding end ring portions.

20. The method of claim 1, wherein the impacting compresses the end ring and reduces the size of the slots.

\* \* \* \* \*